United States Patent [19]

Ocasio et al.

[11] 3,760,266
[45] Sept. 18, 1973

[54] CIRCUIT TESTER FOR CHRISTMAS TREE LIGHT SETS

[75] Inventors: Gerardo Ocasio, Bronx, N.Y.; Edwin Tuman, Chicago, Ill.

[73] Assignee: Noma-World Wide Inc., Chicago, Ill.

[22] Filed: Oct. 14, 1970

[21] Appl. No.: 80,628

[52] U.S. Cl. ............................................. 324/51
[51] Int. Cl. ........................................... G01r 31/02
[58] Field of Search .................. 324/51; 339/108 TP

[56] References Cited
UNITED STATES PATENTS

| | | | |
|---|---|---|---|
| 2,763,834 | 9/1956 | MacDonald et al. | 339/108 TP X |
| 2,846,644 | 8/1958 | Costello | 324/53 |
| 1,190,308 | 7/1916 | Levy | 324/51 X |
| 1,835,882 | 12/1931 | Krippner | 324/51 |
| 1,986,414 | 1/1935 | Saunders | 324/51 |
| 2,186,212 | 1/1940 | Scoggin | 324/51 |

*Primary Examiner*—Gerard R. Strecker
*Attorney*—Marvin B. Rosenberg

[57] ABSTRACT

A simple and economical light circuit tester for use with a set of Christmas tree lights is provided. The circuit tester is composed of a plug having a single wire electrical lead connected to one prong of the plug. The single wire lead is connected in series with a light bulb mounted in a Christmas tree light socket. The light bulb is connected in series with a probe by means of the same single wire lead.

2 Claims, 3 Drawing Figures

Patented Sept. 18, 1973

3,760,266

CIRCUIT TESTER FOR CHRISTMAS TREE LIGHT SETS

BACKGROUND OF THE INVENTION

In the past, circuit testers have been provided to, for example, determine whether a discontinuity in an electrical circuit is present and/or to determine whether an appliance or a circuit in which an appliance is connected is grounded. Such devices although performing a simple function have been somewhat complex in structure and generally are formed as a single probe and test circuit unit which employs many components, such as resistors, capacitors and the like. One such device is shown in U. S. Pat. No. 2,917,705 to Clough. The Clough patent shows a device which employs a probe-test circuit unit connected to an electrical outlet. The unit has an indicator which is adapted to visably detect the passage of current through the testing circuit and employs an internal electrical circuit which is designed to permit the device to operate regardless of the orientation of the plug in the wall outlet.

The device shown by Clough is suitable for its purpose. However, it is, to an extent, complex and includes many parts which increase its cost of production. Thus, it is not practical as a device for testing, for example, a Christmas tree light set circuit to determine which bulb or bulbs in the circuit have burned out. The cost of a unit such as Clough's is too high to make it worthwhile for the average home-owner merely to test his Christmas tree light set.

STATEMENT OF THE INVENTION

This invention provides a simple light circuit tester which can be sold inexpensively enough to be used in conjunction with, and even solely for testing, a set of Christmas tree lights to determine which in the series of lights is burned out. Moreover, the tester employs ordinary components of a Christmas tree light set and thus is in keeping with the circuit in which it is to be used.

The circuit tester of the invention comprises, in combination, a two prong plug; a single wire electrical lead connected to one of the two prongs of the plug, said lead being connected in series with a socket assembly having a bulb mounted therein; and an electrical probe connected in series to the socket assembly via the single wire electrical lead.

GENERAL DESCRIPTION OF THE INVENTION AND SPECIFICATION

The circuit tester of the invention, as contrasted to the circuit testers provided by the prior art, is composed of individual components, linked together only by electrical wiring. Moreover, the components are of the type associated with the Christmas tree light circuit in which the tester is used. That is, for example, the circuit tester includes a standard Christmas tree light socket and a slightly modified connection into the circuit so as to permit the socket and bulb to operate as a part of a circuit tester. Thus, the tester itself harmonizes with the Christmas tree lighting outfit with which it is used.

Figure 1:
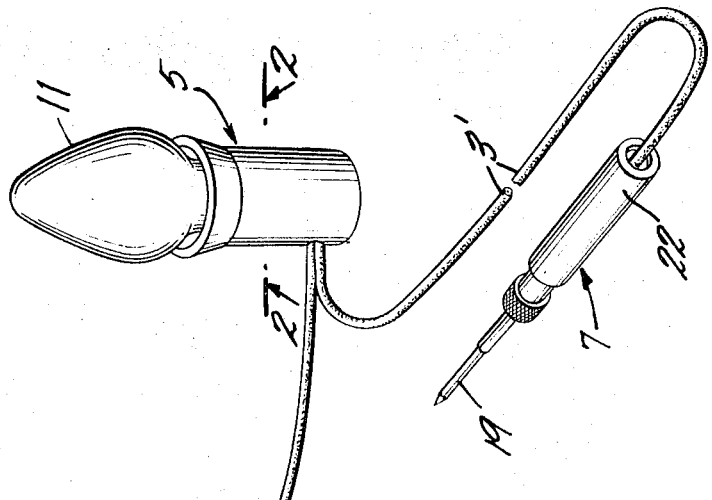
FIG. 1 is a view in perspective of the light circuit tester of the invention.
Figure 2:
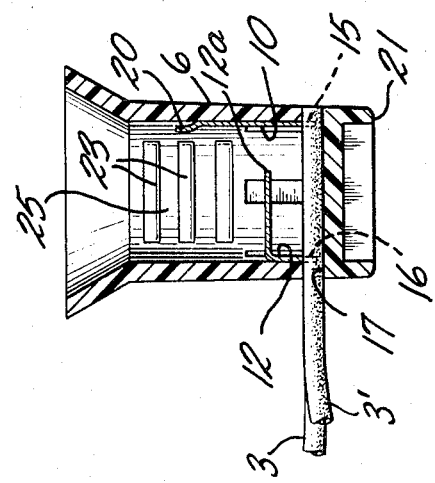
FIG. 2 is a view partially in cross-section taken along the line 2—2, of FIG. 1 of the socket assembly, but omitting the bulb shown in FIG. 1.

The circuit tester as shown in FIG. 1 comprises a plug 1 having only one prong 28 connected by a single electrical lead 3 into the circuit. The lead 3 connects the active prong 28 to a Christmas tree light socket assembly 5. The same single lead leads from the socket assembly 5 to a circuit testing probe 7. The socket assembly 5, as best seen by references to FIG. 2 comprises a plastic socket body 6 having a pair of pintap connectors 10 and 12 fixed therein. The pintap connectors are bonded to the walls of the socket 6 so as to hold them in position in the socket body 6. The pintap connector 10 has a pointed end 15 which projects into a central channel 17 formed in the base of the socket body, through which the electrical lead passes. The connector 10 engages the side of the bulb and has a series of protrusions which serve as threads for engagement of the threaded bulb base. The end portion 20 of the connector is bent inwardly so as to firmly engage the bulb in good electrical contact therewith. The other of the pintap connectors 12, is bent at a right angle to the wall of the socket body and has a contact arm 12a which extends into the central cavity 25 of the socket body 6 into a position so as to engage the bottom of the bulb base. This connector 12 also has a pointed end 16 which projects into the channel 1 through which the wire passes. This pin 16 is positioned with respect to the pin 15 and so as to be laterally spaced from the pin 15 and thereby the pin engages 16 one wire of any pair of wires which pass through the channel 17 and the other pin 15 engages the other wire of the pair. In this invention, however, since only a single wire lead is employed, the lead is folded back on itself so as to form a pair of lead wires passing through the channel 17. This can best be seen by reference to FIG. 1. The pin tap 16 thus makes a contact with one portion of the lead 3 and the tap 15 makes contact with another portion of the same lead. The lead however, is severed between the pin tap connectors 15 and 16 so that a bulb mounted in the socket body 6 is in series in the circuit formed by the lead 3.

The folded lead is held in position in the channel 17, and in firm connection to the pin taps 15 and 16 by a cap 21 mounted on the base of the socket body 6. The cap 21 can fit in a mating snap-on connection to the socket body, or could be fitted in a threaded connection or the like. One suitable type of mating cap and socket body construction is shown in U. S. Pat. No. 3,372,362 to Schick. Other similar constructions are well known to those skilled in the art and can also be used.

A bulb 11 is mounted in the socket 6 by means of protrusions 23 which act as a series of threads for the threaded base of the bulb. ( not shown )

The single lead 3' which is in series with the bulb 11, extends from the socket assembly 5 to the probe 7. The probe 7 has a pointed end 19 which permits connections to be made at various points of the circuit, if necessary, by piercing the insulation of the wire of the circuit. The probe has a barrel-type body 22 about the point at which the probe point 19 is connected to the lead 3' which serves as a handle or grip for the probe.

The lead 3, which extends from the plug 1 to the socket 6, is connected to only one prong of the plug.

Figure 3:
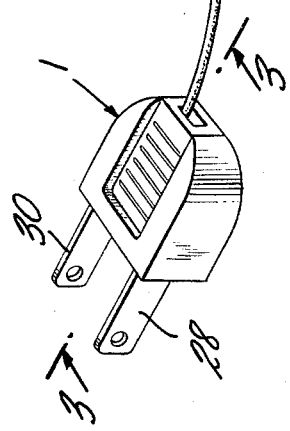
FIG. 3 is a view in cross-section taken along the line 3—3 of FIG. 1 of the plug assembly.

This connection is best seen by reference to FIG. 3. The lead 3 extends through a central passage 24 formed in the plug 1. The lead 3 is bent over a shoulder 26 formed in the plug and extends into a channel 27. The prong 28, which engages the lead 3, has a pin 29 which, when the prong is inserted into the plastic body of the plug, pierces the insulation of the lead 3 and makes an electrical connection therewith. The remaining prong 30, when inserted into the plug body merely is retained in position in the plug body but does not form any electrical connection to the lead 3.

In operation, in order to test a circuit, the plug is connected into an outlet. Preferably this outlet is the same outlet into which the Christmas tree light circuit to be tested is plugged. To test the bulb in any socket, first, it is necessary to be sure that the prong of 28 of the plug 1 is connected into the same circuit as the light socket to be tested. This is done by first testing the socket with an indicator light which is known to be in working order. To do this the probe is touched to a conductive portion of the socket such as the portion of the pin tap connector 20 which engages the bulb 11, and if the indicator light 11 goes on, the circuit is properly connected with the active prong 28 in the proper position. If, however, the light does not go on, since the bulb 11 is known to be in working order , the prong 28 should then be switched to the opposite of the pair of the prong receptacles in the wall outlet. The light bulb 11 should then operate when the socket is then again probed. Then, to test the Christmas tree light circuit, a bulb is removed from one of the intermediate sockets in the light set. That socket is probed, and if the indicator lamp 11 goes on, all of the bulbs between that socket and the wall outlet are in operating condition. If the light bulb 11 does not go on, however, at least one of the bulbs between the wall outlet and the probed socket is defective. By a process of elimination, the exact location of the defective bulb or bulbs can be determined. In all instances, it is not necessary to remove the bulbs from the sockets to test the circuit. Where a screw-type connection is used, it is only necessary to loosen the bulb in the socket to perform the circuit test.

Having regard to the foregoing disclosure, the following is claimed as the inventive and patentable embodiments thereof:

1. A light circuit and bulb tester specially designed and adapted to be used with a Christmas tree light set, and incorporating components similar to those of a Christmas tree light set comprising, in combination, a plug having a pair of prongs; a single electrical lead extending into said plug and connected to only one of said prongs, said single lead comprising the only connection to said plug; a probe having a pointed probe tip in electrical connection with said plug, said probe having a single electrical lead extending therefrom comprising the only electrical connection to said probe; a Christmas tree light socket assembly interposed in the electric line between said plug and said probe, said socket assembly being connected in series between the plug and the probe by said single electric leads extending from the probe and the plug, each of said probe, said plug, and said socket assembly comprising separate and distinct units spaced apart from each other and connected to each other only by a single electrical lead; said socket assembly comprising a Christmas tree light socket having a substantially cylindrical plastic body formed with a central passage in which a Christmas tree light bulb is positioned, said socket body having a transverse channel formed adjacent to the bottom thereof, and a pair of pin tap connectors fixed within the socket body and each having a connector pin protruding into the channel in spaced positions, each of said pin tap connectors being connected to said bulb to connect the bulb into the circuit; said single electrical leads being positioned in said channel and being electrically connected to the pin tap connectors, and being discontinuous between the pin tap connectors so as to connect the bulb in series in the circuit; and a closure at the base of the socket assembly closing off the bottom of the socket body, and retaining the leads in position in the channel and in the electrical connection with the pin tap connectors.

2. A light circuit tester and bulb tester specially designed and adapted to be used with a Christmas tree light set, and incorporating components similar to those of a Christmas tree light set in accordance with claim 1, in which one of the pin tap connectors engages the bottom of the bulb base and the other engages the side of the bulb base.

* * * * *